3,501,410
BENZOPYRYLOSPIRAN PHOTOCHROME CONTAINING AN ELECTRON ACCEPTOR
Gordon C. Newland and John W. Tamblyn, Kingsport, Tenn., assignors to Eastman Kodak Company, Rochester, N.Y., a corporation of New Jersey
No Drawing. Filed July 6, 1966, Ser. No. 563,040
Int. Cl. F21v 9/10; G02b 1/04
U.S. Cl. 252—300                     12 Claims

ABSTRACT OF THE DISCLOSURE

A phototropic composition comprising a mixture of (A) a phototrope having the general formula:

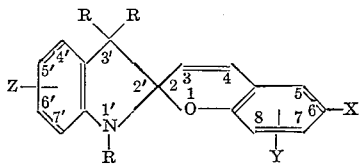

wherein X, Y and Z are the same or different monovalent radicals selected from the group consisting of hydrogen, carboxyl, alkoxy, nitro, hydroxyl, alkoxycarbonyl, cyano, halogen, amido, alkylsulfone arylsulfone, acyl, and acylamido, in which the hydrocarbyl groups attached to functional moieties containing such have not more than 8 carbon atoms, at least one of said X, Y and Z substituents being other than hydrogen, said substituent Z being located at positions 5' to 7', inclusive, and said substituents X and Y being located at positions 5 to 8, inclusive, and wherein R is a hydrocarbyl radical of not more than 20 carbon atoms; and (B) an electron acceptor selected from the group consisting of oxalic acid; mono- or poly-substituted benzene compounds wherein the substituents are hydroxyl, carboxyl, cyano, aldehyde, nitro, combinations thereof with alkoxy groups or combinations thereof with each other; compounds containing a cyano group and a carboxyalkoxy group attached to a methylene radical; aliphatic compounds containing at least two cyano groups attached to an ethylenic bond; and oxidizing agents selected from the group consisting of peroxides and benzoquinones.

---

The present invention relates to phototropic compositions and, more particularly, to phototropic compositions which fade rapidly when removed from exposure to a bright light source which contains ultraviolet radiation such as sunlight.

Phototropes or photochromes are compounds or compositions which darken in color as a result of being exposed to sunlight or other sources of bright light containing in its spectrum ultraviolet radiation. When returned to dim light or darkness, phototropes lighten in color. If the darkening and lightening action is sufficiently reversible and can be repeated substantially indefinitely, these compositions are useful in many applications such as protective eyeglasses or goggles, window shades, packaging film, windshields, windows, and the like. A particularly superior class of phototropes are substituted spirobenzopyranindolines. One of the problems associated with the use of these and other phototropes is the rate at which the phototropes lighten in color when removed from sunlight and similar bright light sources. An increase in the rate of fading not only makes the phototropic composition more useful in additional applications, but, furthermore, is of extreme importance in applications in which continued vision is essential.

It is, therefore, an object of the present invention to provide novel phototropic compositions.

It is another object of the present invention to provide phototropic compositions which exhibit improved utility in phototropic application.

It is still another object of the present invention to provide phototropic compositions which have superior fading powers when returned to dim light or darkness on exposure to bright light.

Other objects and advantages of the present invention will become apparent from the following description and claims.

The phototropic compositions of the present invention comprise mixtures of (A) a phototrope having the general formula

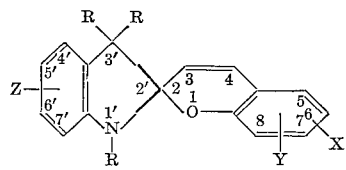

where X, Y, and Z are the same or different monovalent radicals selected from the group consisting of hydrogen, carboxyl (—COOH), alkoxy, nitro, hydroxyl, alkoxycarbonyl, cyano, halogen, amino, amido, alkylsulfone, arylsulfone, acyl, and acylamido, in which the hydrocarbyl groups attached to functional moieties containing such have not more than 8 carbon atoms and are, preferably, alkyl radicals of 1 to 4 carbon atoms, at least one of said substituents being other than hydrogen in said phototrope, and substituent Z being located in positions 5' to 7', inclusive, and said substituents X and Y being located at positions 5 to 8, inclusive, and wherein R is a hydrocarbyl radical such as alkyl, cycloalkyl, alkenyl, aryl, alkaryl, and aralkyl, having not more than 20 carbon atoms and, preferably, is an alkyl radical of 1 to 4 carbon atoms; and (B) an electron acceptor. The phototropes are generally employed in the form of solutions in liquid or solid media. Although such media can affect the properties of the phototrope, e.g., the color, phototropic activity is not eliminated but merely altered. Hence, the medium, although it may be critical in any particular application intended for the phototrope, is not critical insofar as the basic discovery of the present invention is concerned, and the improvements derived from the phototropic compositions of the present invention can be realized in any medium in which the phototrope alone can be employed. The preferred media are resins and polymers and, more particularly, thermoplastic resins and organic solvents.

The present invention is based on the discovery that the addition of electron acceptors to a phototropic solution increases the rate of fading when such solution is returned to dim light on exposure to bright light. The effectiveness of the electron acceptor in accelerating the rate of fading will vary with the particular electron acceptor, the phototrope as well as with the medium in which the electron acceptor and the phototrope are dispersed. Thus, for any particular medium and phototrope, the optimum electron acceptor is generally established by experimental techniques such as described herein. The concentration of the phototrope can be varied widely and will depend on the utility intended. In general, a concentration of from 0.001 to 10% by weight of the medium of phototrope will be satisfactory for most applications. The concentration of the electron acceptor can be similarly varied widely and will depend on the particular rate of fading desired. In general, a molar excess of electron acceptor over the quantity of phototrope is employed. Large excesses of the electron acceptor do not interfere with the function of the phototrope. Thus, the molar ratio of electron acceptor to phototrope can vary anywhere from 1:100 to 100:1.

The spirobenzopyranindolines employed in the compositions of the present invention are described in the literature and are generally prepared by the reaction of correspondingly substituted 2-methyleneindolines with correspondingly substituted hydroxybenzaldehydes in the presence of a solvent such as ethanol with or without a catalyst such as piperidine. The initial condensation product of the 2-methyleneindoline is converted to the spirobenzopyranindoline with base. Instead of the 2-methyleneindoline, the corresponding indoleninium salt can be employed. Phototropic spirobenzopyranindolines include:

8-methoxy-5'-methoxycarbonyl-1',3',3'-trimethyl-6-nitrospiro(2H-1-benzopyran-2,2'-indoline),
5'-methoxycarbonyl-1',3',3'-trimethyl-6-nitrospiro(2H-1-benzopyran-2,2'-indoline),
6-methoxy-5'-methoxycarbonyl-1',3',3'-trimethyl-8-nitrospiro(2H-1-benzopyran-2,2'-indoline),
5'-methoxycarbonyl-1',3',3'-trimethyl-7-diethylaminospiro(2H-1-benzopyran-2,2'-indoline),
5'-methoxycarbonyl-1',3',3'-trimethyl-7-hydroxyspiro(2H-1-benzopyran-2,2'-indoline),
5'-methoxycarbonyl-1',3',3'-trimethyl-6-hydroxyspiro(2H-1-benzopyran-2,2'-indoline),
5'-methoxycarbonyl-1',3',3'-trimethyl-8-methoxyspiro(2H-1-benzopyran-2,2'-indoline),
5'-methoxycarbonyl-1',3',3'-trimethyl-8-nitrospiro(2H-1-benzopyran-2,2'-indoline),
5'-methoxycarbonyl-1',3',3'-trimethyl-6,8-dibromospiro(2H-1-benzopyran-2,2'-indoline),
5'-methoxycarbonyl-1',3',3'-trimethyl-6,8-dichlorospiro(2H-1-benzopyran-2,2'-indoline),
5'-methoxycarbonyl-1',3',3'-trimethyl-6,8-dinitrospiro(2H-1-benzopyran-2,2'-indoline),
5'-methoxycarbonyl-1',3',3'-trimethyl-6-bromo-8-nitrospiro(2H-1-benzopyran-2,2'-indoline),
5'-methoxycarbonyl-1',3',3'-trimethyl-6-methoxyspiro(2H-1-benzopyran-2,2'-indoline),
5'-methoxycarbonyl-1',3',3'-trimethyl-6-chlorospiro(2H-1-benzopyran-2,2'-indoline),
5'-methoxycarbonyl-1',3',3'-trimethyl-6-bromospiro(2H-1-benzopyran-2,2'-indoline),
5'-methoxycarbonyl-1',3',3'-trimethyl-6-bromo-8-methoxyspiro(2H-1-benzopyran-2,2'-indoline),
5'-methoxycarbonyl-1',3',3'-trimethyl-6-methoxy-8-bromospiro(2H-1-benzopyran-2,2'-indoline),
5'-methoxycarbonyl-1',3',3'-trimethyl-5-nitro-8-methoxyspiro(2H-1-benzopyran-2,2'-indoline),
5'-methoxycarbonyl-1',3',3'-trimethyl-5,7-dichloro-6-nitrospiro(2H-1-benzopyran-2,2'-indoline),
5'-methoxycarbonyl-1',3',3'-trimethyl-5,6-dinitro-8-methoxyspiro(2H-1-benzopyran-2,2'-indoline),
5'-methoxycarbonyl-1',3',3'-trimethyl-6-nitro-8-fluorospiro(2H-1-benzopyran-2,2'-indoline),
5'-acetyl-1',3',3'-trimethyl-6-nitro-8-bromospiro(2H-1-benzopyran-2,2'-indoline),
5'-methoxycarbonyl-1',3',3'-trimethyl-5-nitro-8-chlorospiro(2H-1-benzopyran-2,2'-indoline),
5'-methoxycarbonyl-1',3',3'-trimethyl-8-hydroxyspiro(2H-1-benzopyran-2,2'-indoline),
5'-methoxycarbonyl-1',3',3'-trimethyl-8-diethylaminospiro(2H-1-benzopyran-2,2'-indoline),
1',3',3'-trimethyl-6-nitrospiro(2H-1-benzopyran-2,2'-indoline),
1',3',3'-trimethyl-8-nitrospiro(2H-1-benzopyran-2,2'-indoline),
1',3',3'-trimethyl-6-nitro-5chlorospiro(2H-1-benzopyran-2,2'-indoline),
1',3',3'-trimethyl-6-nitro-8-methoxyspiro(2H-1-benzopyran-2,2'-indoline),
1',3',3'-trimethyl-6-nitro-8-chlorospiro(2H-1-benzopyran-2,2'-indoline),
1',3',3'-trimethyl-5-nitro-8-methoxyspiro(2H-1-benzopyran-2,2'-indoline),
1',3',3'-trimethyl-6-bromo-8-nitrospiro(2H-1-benzopyran-2,2'-indoline),
1',3',3'-trimethyl-6-nitro-8-fluorospiro(2H-1-benzopyran-2,2'-indoline),
1',3',3'-trimethyl-7'-methoxycarbonyl-6-nitrospiro(2H-1-benzopyran-2,2'-indoline),
1',3',3'-trimethyl-6-nitro-8-iodospiro(2H-1-benzopyran-2,2'-indoline),
8-methoxy-1',3',3'-trimethyl-5'-(methylsulfonyl)-6-nitrospiro(2H-1-benzopyran-2,2'-indoline),
6,8-dibromo-1',3',3'-trimethyl-5'-(methylsulfonyl)spiro(2H-1-benzopyran-2,2'-indoline),
8-methoxy-6-methoxycarbonyl-1',3',3'-trimethyl-6-nitrospiro(2H-1-benzopyran-2,2'-indoline), and
5'-methoxy-1',3',3'-trimethyl-8-nitrospiro(2H-1-benzopyran-2,2'-indoline).

The preferred phototropes are those in which Z is hydrogen or an alkoxycarbonyl radical and X and Y are nitro groups, halogens, or a nitro group in combination with hydrogen, methoxy group, or a halogen.

The electron acceptors which can be employed in the present invention are compounds which are soluble in the medium in which they are employed in concentrations in which such are effective as accelerators, and contain atoms whose outer electron shells are incompletely filled and thus capable of accepting electrons from other atoms. The preferred electron acceptors of the present invention are compounds which contain two interconnected carboxylic acid groups such as oxalic acid; mono- or poly-substituted benzene compounds wherein the substituents are hydroxyl, carboxyl, cyano, carboxyalkoxy, aldehyde, nitro groups or combinations thereof with alkoxy groups or with each other, such as benzoic acid, benzonitrile, phenol, benzaldehyde, anisic acid, p-cyanobenzoic acid, p-hydroxybenzoic acid, p-formylbenzoic acid, p-carbothoxyphenol, 2,4,6-trinitrobenzoic acid, methyl-p-nitrobenzoate, and methyl-p-hydroxybenzoate; compounds containing a cyano group and a carboxyalkoxy group attached to a methylene group, such as methyl or ethyl cyano acetate; compounds containing at least two cyano groups attached to an ethylenic double bond, such as tetracyanoethylene, 2 - cyano - 3 - (p-dodecylphenyl)acrylonitrile, 2-cyano-3-(p - methoxyphenyl)acrylonitrile, and tetracyanoquiodimethane; and oxidizing compounds such as peroxides and benzoquinones. Specific examples of suitable oxidizing agents include potassium perchlorate, cumylhydroperoxide, tert-butyl-hydroperoxide, potassium permanganate, p-benzoquinone, p-nitrophenyl-p-benzoquinone. Since the electron affinity of the electron acceptors is primarily determined by the specific functional moieties listed, the size of any hydrocarbyl group attached to such functional moiety is not significant, although it is generally preferred that such hydrocarbyl groups are $C_1$ to $C_8$ alkyl groups.

The combination of phototrope and electron acceptor can be employed in any substantially transparent, inert liquid or solid medium in which the improved phototropic composition is soluble in effective concentrations. Since the phototropic composition can be employed in very dilute form, solubility is not generally a problem in employing the phototropic compositions of the present invention. The time requirement for the phototrope to fade on being removed from bright light, in general, decreases as the fluidity of the medium increases. Thus, the rate of fading decreases when proceeding from an organic solvent to a plasticized resin and then to an unplasticized resin. A similar effect is observed if the fluidity of the medium is increased by means of raising the tempertaure. In some applications for the phototropic compositions, it may, therefore, be preferable to employ the phototropic composition as contained or encapsulated liquid solutions or dissolved in a deformable, soft, plastic material which is employed as an interlayer between transparent sheets of material having the desired mechanical properties. Suitable organic solvents include hydrocarbons, halogenated hydrocarbons, alcohols, esters, ketones, ethers, and the like. Suitable solid materials include, in particular, thermoplastic resins. Examples of such are cellulose esters such as cellulose butyrate acetate, polyvinylalcohol, polyvinylacetals such as polyvinylbutyral, polystyrene, styrene interpolymers such as styrene acrylonitrile copolymers and acrylonitrile-butadiene-styrene interpolymers, vinyl halide polymers such as polyvinyl chloride, polyacrylate resins such as polymethyl methacrylate, polyolefins such as polyethylene, polypropylene and ethylene acrylate copolymers and polyvinyl esters such as polyvinyl acetate. Particularly preferred thermoplastic resins are plasticized and unplasticized cellulose ester resins.

Various means heretofore employed for the compounding of additives with thermoplastic resins can also be employed for the phototropic composition of the present invention. Such methods include the solution of resin and phototropic composition in a common solvent, followed by mixing and evaporation of the solvent, although, preferably, the resin is heated to a sufficiently fluid state above its softening point and then directly admixed with the phototropic composition. Rubber mills, Banbury mixers, and screw extruders are employed in such methods. Care should, of course, be taken that the temperatures employed do not cause the degradation of the components of the mixture. More than one phototrope can be compounded with more than one electron acceptor using the above-indicated media or media which are mixtures of solvents, thermoplastic resins, or thermoplastic resins and solvents.

The effectiveness of the phototropic compositions of the present invention in fading on being returned to dim light subsequent to exposure to bright light is further illustrated in the following examples in which, unless otherwise indicated, all parts are by weight.

EXAMPLE 1

A blend of cellulose acetate butyrate (13% acetyl, 38% butyryl), 100 parts, 12 parts of dibutyl sebacate as plasticizer, and 0.1 part of 5',6-dinitro-1',3',4'-trimethylspiro(2H-1-benzopyran-2,2'-indoline) is prepared by hot-roll compounding, employing temperatures of 270° F. for the front roll and 230° F. for the back roll. Compounding is continued until a uniform blend is obtained. Sheets, 50 mil thick, are compression-molded from the blend at 320° F. The procedure is repeated to make sheets which contain, in addition, 1.0 part of anisic acid.

Sheets of each composition are exposed for 10 minutes to the light from a General Electric RS–275 Sun Lamp at a distance of 12 inches for the lamp. The rate of decay of developed color, after the exposed samples are removed from the sun lamp and placed in ordinary room light, is measured with a densitometer calibrated to read directly in optical density. As a measure of the extent of recovery from the effects of exposure, the percentage losses of developed optical density after recovery times of 1, 2, 5, and 10 minutes are measured. For the composition containing the phototrope alone, the percentage losses are 55%, 75%, 85%, and 90%, respectively, and for the composition containing both the phototrope and the electron acceptor, the percentage losses are 59%, 87%, 100% and 100%, respectively. The addition of the anisic acid produces a significant acceleration of the rate of recovery. For comparison, the corresponding recovery values for commercially available phototropic sun-glasses after recovery times of 1, 2, 5, 10, and 15 minutes are 17%, 21%, 42%, 58%, and 71%, respectively.

EXAMPLE 2

Employing the procedure of Example 1, phototropic sheets are prepared containing 1',3',3' - trimethyl - 8-methoxy-6-nitrospiro(2H-1-benzopyran-2,2'-indoline- and 1.0 part of potassium perchlorate. Control formulations containing no electron acceptor are also prepared.

The percentage recovery values after recovery times of 1, 2, 5, 10, and 15 minutes are 7%, 11%, 37%, 42%, and 52%, respectively, for the control formulation, and 18%, 45%, 58%, 79%, and 100%, respectively, for the formulation containing the electron acceptor.

EXAMPLE 3

Employing the procedure of Example 2, except that the phototrope is employed in a concentration of 0.01 part, recovery values after recovery times of 1, 2, 5, 10, and 15 minutes are, respectively, 25%, 30%, 50%, 65%, and 75% for the control formulation, and 40%, 56%, 84%, 92%, and 100%, respectively, for the formulation containing the electron acceptor.

EXAMPLES 4–19

Benzene solutions containing 0.01% of 1',3',3'-trimethyl - 6 - nitro-8-methoxyspiro(2H-1-benzopyran-2,2'-indoline) and the electron acceptors set forth in the table below in the likewise indicated concentrations are prepared. The compositions are exposed to a General Electric RS–275 Sun Lamp and then allowed to return from the characteristic blue color to a colorless solution observed in indoor illumination. The fading times are reported in Table I.

TABLE I

| Example | Electron Acceptor | Percent Concn. | Fading time, sec. (time required for ca. 100% recovery) |
|---|---|---|---|
| 4 | None | | 180 |
| 5 | Benzonitrile | 0.02 | 160 |
| 6 | p-Cyanobenzaldehyde | 0.1 | 120 |
| 7 | Methyl p-methoxybenzoate | 0.05 | 60 |
| 8 | Methyl p-aminobenzoate | 0.05 | 60 |
| 9 | Tetracyanoethylene | 0.05 | 30 |
| 10 | Ethyl cyanoacetate | 0.05 | 30 |
| 11 | p-Hydroxybenzoic acid | 0.02 | 20 |
| 12 | Phenol | 0.01 | 20 |
| 13 | Methyl-m-nitrobenzoate | 0.05 | 15 |
| 14 | p-Carboxy benzaldehyde | 0.05 | 15 |
| 15 | Methyl-p-nitrobenzoate | 0.01 | 15 |
| 16 | Methyl-p-hydroxybenzoate | 0.01 | 15 |
| 17 | p-Cyanobenzoic acid | 0.01 | 15 |
| 18 | Benzoic acid | 0.03 | 5 |
| 19 | Anisic acid | 0.02 | 5 |

EXAMPLES 20–26

To aliquot portions of a 0.02% solution of 1',3',3'-trimethyl - 8-methoxy-6-nitrospiro(2H-1-benzopyran-2,2'-indoline) is added 0.02% of the electron acceptors indicated in the table below. One portion is retained as a control. The solutions are exposed to a General Electric RS–275 Sun Lamp for 10 seconds which is sufficient to develop intense color in all solutions. The solutions are removed from the light and the times required for their return to original colors are recorded. The electron acceptors and the recovery times are given in Table II.

TABLE II

| Example | Electron Acceptor | Time required for return of original color after 10-second irradiation, sec. |
|---|---|---|
| 20 | None | 110 |
| 21 | p-Benzoquinone | 20 |
| 22 | 2,4,5-trinitrobenzoic acid | 40 |
| 23 | 2-cyano-3-(p-dodecylphenyl)acrylonitrile | 50 |
| 24 | 2-cyano-3-(p-methoxyphenyl) acrylonitrile | 55 |
| 25 | p-Nitrophenyl-p-benzoquinone | 60 |
| 26 | 2,3,5-trinitroanixole | 85 |

The foregoing examples have illustrated the effect of electron acceptors on the fading rate of spirobenzopyranindoline phototropes in various media. Increases in the fading rate or recovery are obtained when other spirobenzopyranindolines falling within the scope of the present invention are substituted for the ones specifically illustrated or if other electron acceptors are employed with such phototropes.

Although the invention has been described in detail with reference to preferred embodiments thereof, it will be understood that variations and modifications can be effected within the spirit and scope of the invention as described hereinabove and as defined by the appended claims.

What is claimed is:

1. A phototropic composition comprising a 1:100 to 100:1 molar ratio mixture of (A) a phototrope having the general formula

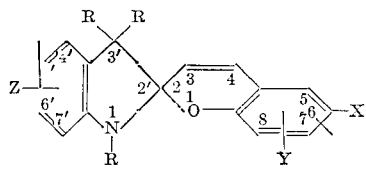

wherein X, Y and Z are the same or different monovalent radicals selected from the group consisting of hydrogen, carboxyl, alkoxy, nitro, hydroxyl, alkoxycarbonyl, cyano, halogen, amido, alkylsulfone, arylsulfone, acyl, and acylamido, in which the hydrocarbyl groups attached to functional moieties containing such have not more than 8 carbon atoms, at least one of said X, Y, Z substituents being other than hydrogen, said substituent Z being located at positions 5′ to 7′ inclusive, and said substituents X and Y being located at positions 5 to 8, inclusive, and wherein R is a hydrocarbyl radical of not more than 20 carbon atoms; and (B) an electron acceptor selected from the group consisting of oxalic acid; mono- or poly-substituted benzene compounds wherein the substituents are hydroxyl, carboxyl, cyano, combinations thereof with alkoxy groups or combinations thereof with each other; compounds containing a cyano group and a carboxyalkoxy group attached to a methylene radical; aliphatic and compounds containing at least two cyano groups attached to an ethylenic bond.

2. The phototropic composition of claim 1, wherein the phototrope R is methyl, Z is hydrogen or an alkoxycarbonyl group and X and Y are nitro groups, halogens, or a nitro group in combination with hydrogen, methoxy group, or a halogen.

3. Phototropic composition of claim 1 wherein in the phototrope R is methyl, Z is an alkoxycarbonyl group, and X and Y are nitro groups, halogens, or a nitro group and one of hydrogen, methoxy or halogen.

4. The phototropic composition of claim 1, wherein the phototrope is 1′,3′,3′-trimethyl - 8 - methoxy-6-nitrospiro-(2H-1-benzopyran-2,2′-indoline).

5. The phototropic composition of claim 1, wherein the phototrope is 1′,3′,3′ - trimethyl-6-methoxy-8-nitrospiro(2H-1-benzopyran-2,2′-indoline).

6. The phototropic composition of claim 1, wherein the phototrope is 8-methoxy-5′-methoxycarbonyl-1′,3′,3′-trimethyl-6-nitrospiro(2H-1-benzopyran-2,2′-indoline).

7. The phototropic composition of claim 1, wherein the phototrope is 1′,3′,3′ - trimethyl - 6-nitrospiro(2H-1-benzopyran-2,2′-indoline).

8. Phototropic composition of claim 1, wherein the electron acceptor comprises oxalic acid.

9. A phototropic composition comprising a 1:100 to 100:1 molar ratio mixture of (A) a phototrope having the general formula

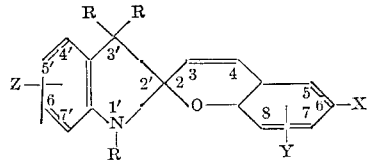

wherein X, Y and Z are the same or different monovalent radicals selected from the group consisting of hydrogen, carboxyl, alkoxy, nitro, hydroxyl, alkoxycarbonyl, cyano, halogen, amido, alkylsulfone, arylsulfone, acyl, and acylamido, in which the hydrocarbyl groups attached to functional moieties containing such have not more than 8 carbon atoms, as least one of said X, Y and Z substituents being other than hydrogen, said substituent Z being located at positions 5′ to 7′, inclusive, and said substituents X and Y being located at positions 5 to 8, inclusive, and wherein R is a hydrocarbyl radical of not more than 20 carbon atoms; and (B) an electron acceptor selected from the group consisting of oxalic acid; mono- or poly-substituted benzene compounds wherein the substituents are hydroxyl, carboxyl, cyano, combinations thereof with alkoxy groups or combinations thereof with each other; compounds containing a cyano group and a carboxyalkoxy group attached to a methylene radical; and aliphatic compounds containing at least two cyano groups attached to an ethylenic bond, said mixture of phototrope and electron acceptor being dissolved in an inert organic solvent with the concentration of the phototrope in the solvent ranging from about 0.001% to about 10% by weight.

10. Phototropic composition of claim 9 wherein the solvent is a hydrocarbon solvent.

11. Phototropic composition of claim 1 wherein the mixture of phototrope and electron acceptor is dissolved in a thermoplastic resin with the concentration of the phototrope in the resin ranging from about 0.001% to about 10% by weight.

12. A phototropic composition comprising a 1:100 to 100:1 molar ratio mixture of (A) a phototrope having the general formula

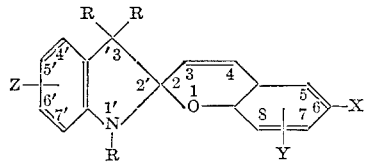

wherein X, Y and Z are the same or different monovalent radicals selected from the group consisting of hydrogen, carboxyl, alkoxy, nitro, hydroxyl, alkoxycarbonyl, cyano, halogen, amido, alkylsulfone, arylsulfone, acyl, and acylamido, in which the hydrocarbyl groups attached to functional moieties containing such have not more than 8 carbon atoms, as least one of said X, Y and Z substituents being other than hydrogen, said substituent Z being located at positions 5′ to 7′, inclusive, and said substituent X and Y being located at positions 5 to 8, inclusive, and wherein R is a hydrocarbyl radical of not more than 20 carbon atoms; and (B) an electron acceptor selected from the group consisting of oxalic acid; mono- or poly-substituted benzene compounds wherein the substituents are hydroxyl, carboxyl, cyano, combinations thereof with alkoxy groups or combinations thereof with each other; compounds containing a cyano group and a carboxyalkoxy group attached to a methylene radical; and aliphatic compounds containing at least two cyano groups attached to an ethylenic bond said mixture of phototrope and electron acceptor being dissolved in a cellulose ester with the concentration of the phototrope in the ester ranging from about 0.001% to about 10% by weight.

References Cited

UNITED STATES PATENTS

| | | | |
|---|---|---|---|
| 3,212,898 | 10/1965 | Cerreta | 260—326.11 |
| 3,322,542 | 5/1967 | Ullman et al. | |
| 2,953,454 | 9/1960 | Berman. | |
| 3,299,079 | 1/1967 | Taylor et al. | 260—326.11 |

ALLAN LIEBERMAN, Primary Examiner

U.S. Cl. X.R.

96—90; 106—176; 260—41, 41.5